United States Patent
Nishii

(10) Patent No.: US 11,236,783 B2
(45) Date of Patent: Feb. 1, 2022

(54) BEARING STRUCTURE

(71) Applicant: IHI Corporation, Koto-ku (JP)

(72) Inventor: Shunsuke Nishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/910,190

(22) Filed: Jun. 24, 2020

(65) Prior Publication Data
US 2020/0325939 A1 Oct. 15, 2020

Related U.S. Application Data

(63) Continuation of application No. PCT/JP2019/000115, filed on Jan. 7, 2019.

(30) Foreign Application Priority Data

Jan. 26, 2018 (JP) .............................. JP2018-011483

(51) Int. Cl.
*F16C 35/02* (2006.01)
*F02C 6/12* (2006.01)
*F16C 17/02* (2006.01)

(52) U.S. Cl.
CPC ................ *F16C 35/02* (2013.01); *F02C 6/12* (2013.01); *F16C 17/02* (2013.01); *F05D 2240/50* (2013.01); *F16C 2360/24* (2013.01)

(58) Field of Classification Search
CPC ........ F16C 17/02; F16C 35/02; F16C 35/067; F16C 2360/24; F02C 6/12; F02C 7/06
See application file for complete search history.

(56) References Cited

U.S. PATENT DOCUMENTS

| 3,811,741 | A | * | 5/1974 | McInerney | F16C 27/02 384/291 |
| 4,240,678 | A | * | 12/1980 | Sarle | F16C 33/10 384/369 |
| 7,670,056 | B2 | * | 3/2010 | Petitjean | F01D 25/16 384/284 |
| 9,140,185 | B2 | * | 9/2015 | Castan | F16C 35/02 |
| 2007/0183704 | A1 | | 8/2007 | Umekawa | |
| 2010/0068053 | A1 | * | 3/2010 | Mathieu | F01D 25/166 415/229 |

(Continued)

FOREIGN PATENT DOCUMENTS

| CN | 1890475 A | 1/2007 |
| DE | 10 2006 055 415 A1 | 5/2008 |

(Continued)

OTHER PUBLICATIONS

International Search Report dated Feb. 19, 2019 in PCT/JP2019/000115 filed on Jan. 7, 2019 (with English Translation), 4 pages (Continued)

*Primary Examiner* — Phillip A Johnson
(74) *Attorney, Agent, or Firm* — Oblon, McClelland, Maier & Neustadt, L.L.P.

(57) ABSTRACT

Provided is a bearing structure including a recess portion, which is formed in at least one of a first opposed surface of a positioning pin or a second opposed surface of a through hole, and is recessed in a separating direction in which the first opposed surface and the second opposed surface separate apart from each other.

6 Claims, 8 Drawing Sheets

(56) References Cited

U.S. PATENT DOCUMENTS

| | | | |
|---|---|---|---|
| 2012/0107112 A1 | 5/2012 | Barlog | |
| 2014/0271128 A1* | 9/2014 | John | F01D 25/186 415/111 |
| 2016/0348719 A1 | 12/2016 | Uneura et al. | |
| 2017/0159708 A1 | 6/2017 | Uneura et al. | |
| 2018/0051744 A1* | 2/2018 | Ammon | F02C 7/06 |

FOREIGN PATENT DOCUMENTS

| | | |
|---|---|---|
| DE | 10 2016 215 275 A1 | 2/2018 |
| EP | 1 705 393 A1 | 9/2006 |
| JP | 03-000315 U | 1/1991 |
| JP | 2002-070570 A | 3/2002 |
| JP | 2004-239388 A | 8/2004 |
| JP | 2005-172098 A | 6/2005 |
| JP | 2005-172099 A | 6/2005 |
| JP | 2009-092199 A | 4/2009 |
| JP | 2010-138757 A | 6/2010 |
| JP | 2010-223249 A | 10/2010 |
| JP | 2011-236967 A | 11/2011 |
| JP | 2013-047551 A | 3/2013 |
| JP | 2014-015854 A | 1/2014 |
| JP | 2014-047680 A | 3/2014 |
| JP | 2014-051898 A | 3/2014 |
| JP | WO2016/006459 A1 | 1/2016 |
| JP | WO2016/052182 A1 | 4/2016 |
| WO | WO 2005/057032 A1 | 6/2005 |
| WO | WO 2016/006459 A1 | 1/2016 |
| WO | WO 2016/052182 A1 | 4/2016 |

OTHER PUBLICATIONS

German Office Action issued in German Patent Application No. 112019000528.6 dated Nov. 30, 2021.

* cited by examiner

BEARING STRUCTURE

CROSS REFERENCE TO RELATED APPLICATIONS

This application is a continuation application of International Application No. PCT/JP2019/000115, filed on Jan. 7, 2019, which claims priority to Japanese Patent Application No. 2018-011483, filed on Jan. 26, 2018, the entire contents of which are incorporated by reference herein.

BACKGROUND ART

Technical Field

The present disclosure relates to a bearing structure.

Related Art

According to Patent Literature 1, a semi-floating bearing is received in a bearing hole of a bearing housing. The semi-floating bearing has a cylindrical shape. The semi-floating bearing has a pin hole passing through an outer peripheral surface and an inner peripheral surface. A fixing pin (positioning pin) is inserted into the pin hole of the semi-floating bearing. With the fixing pin inserted into the pin hole, movement of the semi-floating bearing in an axial direction and in a circumferential direction is regulated.

CITATION LIST

Patent Literature

Patent Literature 1: Japanese Patent Application Laid-Open No. 2014-015854

SUMMARY

Technical Problem

However, the pin hole of Patent Literature 1 has a circular shape, and the fixing pin has a circular column shape. Therefore, contact between the pin hole and the fixing pin is local contact (Hertzian contact). When the contact between the pin hole and the fixing pin is the Hertzian contact, stress generated at a contact portion between the pin hole and the fixing pin is high. Thus, there is a fear in that the contact portion between the pin hole and the fixing pin is excessively worn.

The present disclosure has an object to reduce wear of a bearing.

Solution to Problem

In order to solve the above-mentioned problem, according to one mode of the present disclosure, there is provided a bearing structure, including: a bearing including a main body having a cylindrical shape through which a shaft is inserted, the main body having a through hole passing through the main body in a direction crossing an axial direction of the shaft; a positioning member inserted into the through hole; and a recess portion, which is formed in at least one of a first opposed surface located on an outer peripheral surface of the positioning member and opposed to an inner peripheral surface of the through hole in the axial direction of the shaft or a second opposed surface located on an inner peripheral surface of the through hole and opposed to an outer peripheral surface of the positioning member in the axial direction of the shaft, and is recessed in a separating direction in which the first opposed surface and the second opposed surface separate apart from each other.

The first opposed surface and the second opposed surface may each have a flat surface portion having a flat surface shape.

The recess portion may have a variation portion in which a recess amount in the separating direction continuously varies.

The the positioning member may include: an insertion portion inserted into the through hole; and a position regulating portion, which is formed continuously with the insertion portion, and has a sectional area larger than a sectional area of the insertion portion in a cross section orthogonal to the insertion direction of the insertion portion.

The position regulating portion may be formed so as to have an orientation determination portion on a side opposite to a side continuous with the insertion portion.

Effects of Disclosure

According to the present disclosure, it is possible to reduce wear of a bearing.

DESCRIPTION OF EMBODIMENT

Figure 1:
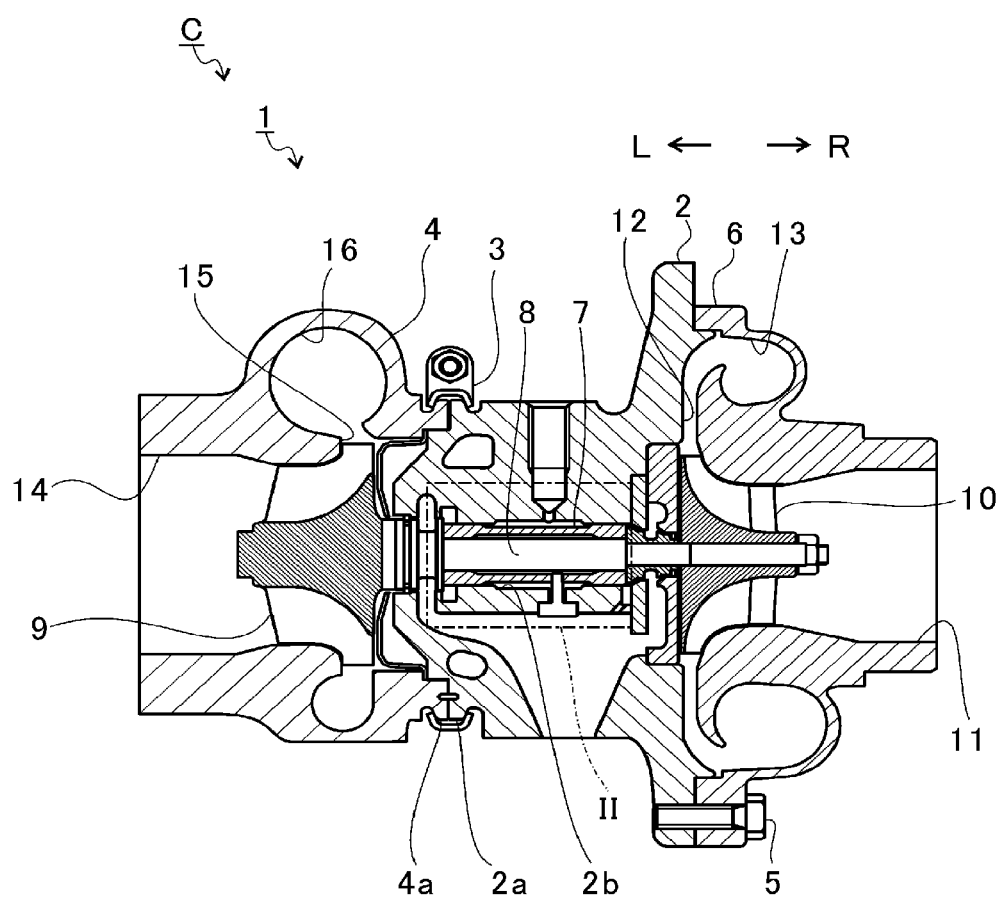
FIG. 1 is a schematic sectional view for illustrating a turbocharger.

Now, with reference to the attached drawings, an embodiment of the present disclosure is described in detail. The dimensions, materials, and other specific numerical values represented in the embodiment are merely examples used for facilitating the understanding of the present disclosure, and do not limit the present disclosure otherwise particularly noted. Elements having substantially the same functions and configurations herein and in the drawings are denoted by the same reference symbols to omit redundant description thereof, and illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2, a turbine housing 4, and a compressor housing 6. The turbine housing 4 is coupled to the left side of the bearing housing 2 by a fastening mechanism 3. The compressor housing 6 is coupled to the right side of the bearing housing 2 by a fastening bolt 5. The bearing housing 2, the turbine housing 4, and the compressor housing 6 are integrated to one another.

On an outer peripheral surface of the bearing housing 2, there is formed a projection 2a. The projection 2a is formed on the turbine housing 4 side. The projection 2a projects in a radial direction of the bearing housing 2. Further, on an outer peripheral surface of the turbine housing 4, there is formed a projection 4a. The projection 4a is formed on the bearing housing 2 side. The projection 4a projects in a radial direction of the turbine housing 4. The bearing housing 2 and the turbine housing 4 are mounted to each other by band-fastening the projections 2a and 4a with the fastening mechanism 3. The fastening mechanism 3 is constructed by, for example, a G-coupling for clamping the projections 2a and 4a.

The bearing housing 2 has a bearing hole 2b. The bearing hole 2b passes in a right-and-left direction of the turbocharger C. A semi-floating bearing 7 (bearing member) is provided in the bearing hole 2b. The semi-floating bearing 7 axially supports a shaft 8 so that the shaft 8 is relatively rotatable (freely rotatable). A turbine impeller 9 is provided at a left end portion of the shaft 8. The turbine impeller 9 is received in the turbine housing 4 so as to be relatively rotatable. A compressor impeller 10 is provided at a right end portion of the shaft 8. The compressor impeller 10 is received in the compressor housing 6 so as to be relatively rotatable.

The compressor housing 6 has a suction port 11. The suction port 11 is opened on the right side of the turbocharger C. The suction port 11 is connected to an air cleaner (not shown). Opposed surfaces of the bearing housing 2 and the compressor housing 6 define a diffuser flow passage 12. The diffuser flow passage 12 increases pressure of air. The diffuser flow passage 12 is annularly defined so as to extend from an inner side toward an outer side in a radial direction of the shaft 8 (hereinafter simply referred to as "radial direction"). The diffuser flow passage 12 communicates with the suction port 11 on the radially inner side through intermediation of the compressor impeller 10.

The compressor housing 6 has a compressor scroll flow passage 13. The compressor scroll flow passage 13 has an annular shape. The compressor scroll flow passage 13 is positioned on, for example, the radially outer side with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is pressurized and increased in speed during a course of flowing through blades of the compressor impeller 10. The air having been pressurized and increased in speed, is increased in pressure in the diffuser flow passage 12 and the compressor scroll flow passage 13. The air increased in pressure is introduced to the suction port of the engine.

The turbine housing 4 has a discharge port 14. The discharge port 14 is opened on the left side of the turbocharger C. The discharge port 14 is connected to an exhaust gas purification device (not shown). A connection passage 15 and a turbine scroll flow passage 16 are formed in the turbine housing 4. The turbine scroll flow passage 16 has an annular shape. The turbine scroll flow passage 16 is positioned on the radially outer side of the turbine impeller 9 with respect to the connection passage 15. The turbine scroll flow passage 16 communicates with a gas inflow port (not shown). The exhaust gas discharged from an exhaust gas manifold of the engine (not shown) is introduced to the gas inflow port. The connection passage 15 connects the turbine scroll flow passage 16 to the discharge port 14. Thus, the exhaust gas introduced through the gas inflow port to the turbine scroll flow passage 16 is introduced to the discharge port 14 through the connection passage 15 and the turbine impeller 9. The exhaust gas to be introduced to the discharge port 14 causes the turbine impeller 9 to rotate during a course of flowing.

Then, a rotational force of the turbine impeller 9 is transmitted to the compressor impeller 10 through the shaft 8. The rotational force of the compressor impeller 10 causes the air to be increased in pressure and introduced to the suction port of the engine as described above.

Figure 2:
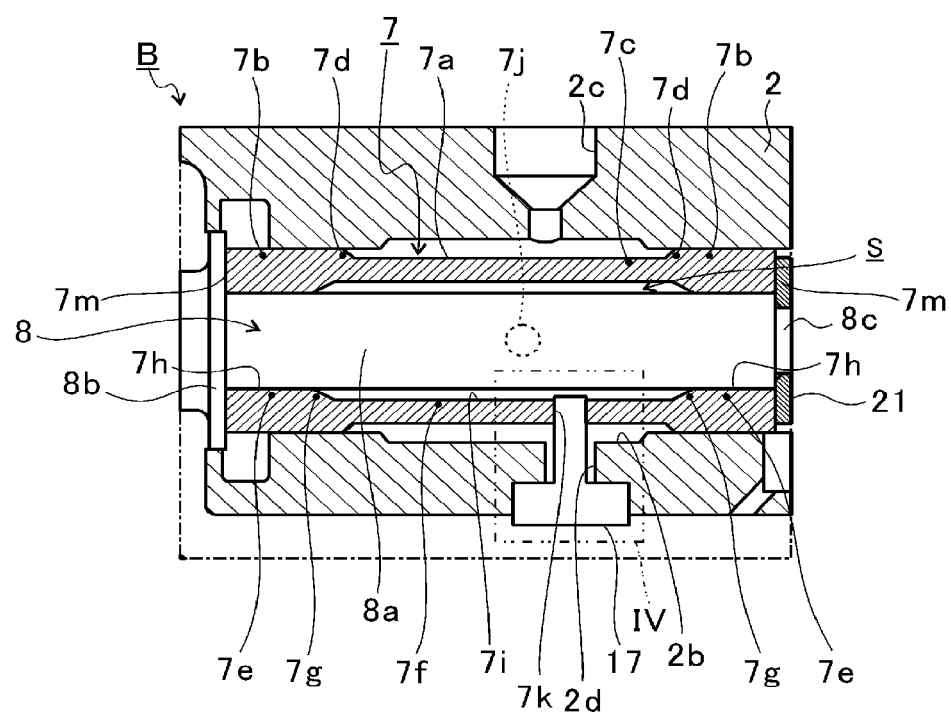
FIG. 2 is an extracted view for illustrating the one-dot chain line portion of FIG. 1.

FIG. 2 is an extracted view for illustrating the one-dot chain line portion of FIG. 1. FIG. 2 shows a configuration of a bearing structure B according to the first embodiment. As illustrated in FIG. 2, the bearing structure B includes the bearing housing 2 (bearing hole 2b), the semi-floating bearing 7, the shaft 8, and a positioning pin 17 described later. The bearing housing 2 has an oil passage 2c. A lubricating oil having been sent out from a pump (not shown) is introduced to the oil passage 2c. The oil passage 2c is open to the bearing hole 2b. The lubricating oil having been introduced to the oil passage 2c flows into the bearing hole 2b. The lubricating oil having flowed into the bearing hole 2b is supplied to the semi-floating bearing 7 provided in the bearing hole 2b.

The semi-floating bearing 7 includes a main body 7a having a cylindrical shape. The shaft 8 is inserted through the main body 7a. The main body 7a has, on a radially outer side thereof (outer peripheral surface side), outer large-diameter portions 7b, an outer small-diameter portion 7c, and outer inclination portions 7d. The outer large-diameter portions 7b, the outer small-diameter portion 7c, and the outer inclination portions 7d are opposed to an inner peripheral surface of the bearing hole 2b.

Two outer large-diameter portions 7b are formed apart from each other in a rotation axis direction of the shaft 8 (hereinafter simply referred to as "axial direction"). The two outer large-diameter portions 7b are closer to the inner peripheral surface of the bearing hole 2b than the outer small-diameter portion 7c. The two outer large-diameter portions 7b function as damper portions.

The outer small-diameter portion 7c is formed between the two outer large-diameter portions 7b. The outer small-diameter portion 7c has an outer diameter smaller than an outer diameter of each of the outer large-diameter portions 7b. The outer small-diameter portion 7c is opposed to an opening through which the oil passage 2c communicates with the bearing hole 2b.

The outer inclination portions 7d are formed between the two outer large-diameter portions 7b and the outer small-diameter portion 7c. Two outer inclination portions 7d are formed apart from each other in the axial direction. The outer inclination portions 7d connect the outer small-diameter portion 7c to the outer large-diameter portions 7b. Outer diameters of the outer inclination portions 7d increase from the outer small-diameter portion 7c toward the outer large-diameter portions 7b.

The main body 7a has, on a radially inner side thereof (inner peripheral surface side), inner small-diameter portions 7e, an inner large-diameter portion 7f, and inner inclination portions 7g. The inner small-diameter portions 7e, the inner large-diameter portion 7f, and the inner inclination portions 7g are opposed to an outer peripheral surface of the shaft 8.

Two inner small-diameter portions 7e are formed apart from each other in the axial direction. The two inner small-diameter portions 7e are closer to the outer peripheral surface of the shaft 8 than the inner large-diameter portion 7f. Two bearing surfaces 7h are formed on inner peripheral surfaces of the two inner small-diameter portions 7e.

The inner large-diameter portion 7f is formed between the two inner small-diameter portions 7e. The inner large-diameter portion 7f has an inner diameter larger than an inner diameter of each of the inner small-diameter portions 7e.

The inner inclination portions 7g are formed between the two inner small-diameter portions 7e and the inner large-diameter portion 7f. Two inner inclination portions 7g are formed apart from each other in the axial direction. The inner inclination portions 7g connect the inner small-diameter portions 7e to the inner large-diameter portion 7f. Inner diameters of the inner inclination portions 7g increase from the inner small-diameter portions 7e toward the inner large-diameter portion 7f. Non-bearing surfaces 7i are formed on inner peripheral surfaces of the inner inclination portions 7g and the inner large-diameter portion 7f.

As described above, the two bearing surfaces 7h (radial bearing surfaces) which are apart from each other in the axial direction are formed on the inner peripheral surface of the semi-floating bearing 7. The two bearing surfaces 7h axially support the shaft 8 so that the shaft 8 is relatively rotatable. Moreover, the non-bearing surfaces 7i are formed between the two bearing surfaces 7h on the inner peripheral surface of the main body 7a. That is, the non-bearing surfaces 7i are located on the right side of the left bearing surface 7h and on the left side of the right bearing surface 7h in FIG. 2. The bearing surfaces 7h are each formed so as to have an inner diameter smaller than an inner diameter of each of the non-bearing surfaces 7i. In other words, the non-bearing surfaces 7i each have an inner diameter larger than an inner diameter of each of the bearing surfaces 7h.

Two thrust bearing surfaces are formed on two end surfaces (both end surfaces) 7m of the main body 7a in the axial direction, respectively. The two thrust bearing surfaces are apart from each other in the axial direction. The two thrust bearing surfaces each have an annular shape.

The main body 7a has an introduction hole 7j passing through the outer small-diameter portion 7c and the inner large-diameter portion 7f in the radial direction. The introduction hole 7j passes through the outer peripheral surface and the inner peripheral surface of the semi-floating bearing 7. The introduction hole 7j has an inlet end in the outer peripheral surface of the semi-floating bearing 7. The introduction hole 7j has an outlet end in the inner peripheral surface of the semi-floating bearing 7. The introduction hole 7j introduces the lubricating oil to a space defined between the inner peripheral surface of the semi-floating bearing 7 and the outer peripheral surface of the shaft 8.

The introduction hole 7j is formed at a position apart from the oil passage 2c in a rotation direction (circumferential direction) of the shaft 8. In the first embodiment, the introduction hole 7j is formed at a position apart from the oil passage 2c by 90° in the rotation direction of the shaft 8. However, a position of the introduction hole 7j with respect to the oil passage 2c is not limited to such a position. For example, the introduction hole 7j may be formed at a position apart from the oil passage 2c by 180° in the rotation direction of the shaft 8. Moreover, the introduction hole 7j may be opposed to the oil passage 2c. In the first embodiment, a position of the introduction hole 7j partially overlaps with a position of the oil passage 2c in the axial direction. However, the introduction hole 7j may be formed at a position completely apart from the oil passage 2c in the axial direction.

The main body 7a has a through hole 7k passing through the outer small-diameter portion 7c and the inner large-diameter portion 7f in the radial direction. The through hole 7k passes through the outer peripheral surface and the inner peripheral surface of the semi-floating bearing 7 in a direction crossing (being orthogonal to) the axial direction of the shaft 8. The positioning pin 17 described later is inserted into the through hole 7k. The through hole 7k is formed at a position apart from the oil passage 2c in the rotation direction of the shaft 8. In the first embodiment, the through hole 7k is formed at a position apart from the oil passage 2c by 180° in the rotation direction of the shaft 8. However, a position of the through hole 7k with respect to the oil passage 2c is not limited to such a position. For example, the through hole 7k may be formed at a position apart from the oil passage 2c by 90° in the rotation direction of the shaft 8. In the first embodiment, a position of the through hole 7k partially overlaps with a position of the oil passage 2c in the axial direction. However, the through hole 7k may be formed at a position completely apart from the oil passage 2c in the axial direction. Moreover, in the first embodiment, the through hole 7k is formed at a position apart from the introduction hole 7*j* in the axial direction of the shaft 8 or in the rotation direction of the shaft 8. The through hole 7*k* is located in a region different from that of the introduction hole 7*j*.

The bearing housing 2 has a pin hole 2*d*. The pin hole 2*d* passes through a wall portion of the bearing housing 2, which has the bearing hole 2*b*, in the radial direction. The pin hole 2*d* is formed at a position apart from the oil passage 2*c* in the rotation direction of the shaft 8. In the first embodiment, the pin hole 2*d* is formed at a position apart from the oil passage 2*c* by 180° in the rotation direction of the shaft 8. However, a position of the pin hole 2*d* with respect to the oil passage 2*c* is not limited to such a position. For example, the pin hole 2*d* may be formed at a position apart from the oil passage 2*c* by 90° in the rotation direction of the shaft 8. In the first embodiment, a position of the pin hole 2*d* partially overlaps with a position of the oil passage 2*c*. However, the pin hole 2*d* may be formed at a position completely apart from the oil passage 2*c* in the axial direction. The pin hole 2*d* is formed at a position which is substantially the same as the position of the through hole 7*k* in the axial direction of the shaft 8 and in the rotation direction of the shaft 8. That is, the pin hole 2*d* is formed in a region being opposed to the through hole 7*k* in the bearing hole 2*b*.

The positioning pin 17 (positioning member) is inserted through the pin hole 2*d* and the through hole 7*k*. The positioning pin 17 is engaged with the pin hole 2*d*. The positioning pin 17 is positioned with respect to the pin hole 2*d* through the engagement with the pin hole 2*d*. Moreover, the positioning pin 17 regulates (restricts) movement of the semi-floating bearing 7 in the axial direction and in the rotation direction (circumferential direction) through the insertion through the through hole 7*k*. In the first embodiment, the positioning pin 17 is press-fitted to the pin hole 2*d*. Moreover, a distal end of the positioning pin 17 is inserted into the through hole 7*k* of the semi-floating bearing 7. A predetermined gap is secured between the positioning pin 17 and the through hole 7*k*. The positioning pin 17 and the through hole 7*k* are relatively movable within a range of the predetermined gap.

The shaft 8 has a small-diameter portion 8*a* inserted through the main body 7*a*. The shaft 8 has a large-diameter portion 8*b*, which has a diameter larger than a diameter of the small-diameter portion 8*a* and is formed integrally with the shaft 8. The shaft 8 has a radially reduced portion 8*c*, which has a diameter smaller than a diameter of the small-diameter portion 8*a* and is formed integrally with the shaft 8. The large-diameter portion 8*b* is located on the left side of the small-diameter portion 8*a* (turbine impeller 9 side) in FIG. 2. The radially reduced portion 8*c* is located on the right side of the small-diameter portion 8*a* (compressor impeller 10 side) in FIG. 2. The large-diameter portion 8*b* and the radially reduced portion 8*c* may be members formed separately from the small-diameter portion 8*a*. The large-diameter portion 8*b* and the radially reduced portion 8*c* may be formed so as to be attachable and detachable with respect to the small-diameter portion 8*a*.

The large-diameter portion 8*b* is opposed to the main body 7*a* in the axial direction. An outer diameter of the large-diameter portion 8*b* is larger than an outer diameter of the main body 7*a* (outer large-diameter portions 7*b*). The outer diameter of the large-diameter portion 8*b* may be smaller than an outer diameter of each of the outer large-diameter portions 7*b* or may be equal to the outer diameter of each of the outer large-diameter portions 7*b*.

An oil thrower member 21 is provided at the radially reduced portion 8*c*. The oil thrower member 21 is located on the right side (compressor impeller 10 side) of the main body 7*a* in FIG. 2. The oil thrower member 21 is an annular member. The oil thrower member 21 diffuses the lubricating oil, which flows toward the compressor impeller 10 side along the shaft 8, toward the radially outer side. That is, the oil thrower member 21 prevents leakage of the lubricating oil toward the compressor impeller 10 side.

The oil thrower member 21 is opposed to the main body 7*a* in the axial direction. An outer diameter of an opposed surface of the oil thrower member 21, which is opposed to the main body 7*a*, is smaller than an outer diameter of each of the outer large-diameter portions 7*b*. The outer diameter of the opposed surface of the oil thrower member 21, which is opposed to the main body 7*a*, may be larger than the outer diameter of each of the outer large-diameter portions 7*b* or may be equal to the outer diameter of each of the outer large-diameter portions 7*b*.

A gap S is defined between the non-bearing surfaces 7*i* of the main body 7*a* and the outer peripheral surface of the shaft 8. The non-bearing surfaces 7*i* of the main body 7*a* are apart from the outer peripheral surface of the shaft 8 in the radial direction. As described above, the main body 7*a* has the introduction hole 7*j*. The outlet end of the introduction hole 7*j* is open to the non-bearing surfaces 7*i*. The lubricating oil having flowed into the bearing hole 2*b* is introduced to the gap S through the introduction hole 7*j*. In other words, the introduction hole 7*j* allows the lubricating oil to be supplied to the gap S.

The relative movement of the semi-floating bearing 7 with respect to the bearing housing 2 is regulated by the positioning pin 17. For example, movement of the semi-floating bearing 7 in the rotation direction of the shaft 8 is regulated by the positioning pin 17. Therefore, when the shaft 8 rotates, relative rotational movement occurs between the small-diameter portion 8*a* of the shaft 8 and the bearing surfaces 7*h* of the semi-floating bearing 7. At this time, through lubrication of the two bearing surfaces 7*h* with the lubricating oil supplied to the gap S, the shaft 8 is axially supported by the bearing surfaces 7*h*.

Moreover, movement of the semi-floating bearing 7 in the axial direction of the shaft 8 is regulated by the positioning pin 17. Here, the semi-floating bearing 7 is sandwiched between the oil thrower 21, which is provided to the shaft 8, and the large-diameter portion 8*b* in the axial direction. The lubricating oil is supplied to a gap defined between the main body 7*a* and the large-diameter portion 8*b*. Similarly, the lubricating oil is supplied to a gap defined between the main body 7*a* and the oil thrower member 21. When the shaft 8 moves in the axial direction, the oil thrower member 21 or the large-diameter portion 8*b* is supported by oil film pressure generated with the main body 7*a*. Movement of the shaft 8 in the axial direction is regulated by the semi-floating bearing 7. That is, the both end surfaces 7*m* of the main body 7*a* in the axial direction function as thrust bearing surfaces. The thrust bearing surfaces receive a thrust load.

In the bearing structure B according to the first embodiment, the thrust load which acts toward the right side in FIG. 2 is received by the end surface 7*m* formed on the left side of the main body 7*a* (turbine impeller 9 side). Moreover, the thrust load which acts toward the left side in FIG. 2 is received by the end surface 7*m* formed on the right side of the main body 7*a* (compressor impeller 10 side). Those thrust loads are finally received by the positioning pin 17 regulating the movement of the semi-floating bearing 7 in the axial direction. The lubricating oil is supplied to a gap defined between the through hole 7k of the main body 7a and the positioning pin 17. When the shaft 8 moves in the axial direction, the main body 7a is supported by the oil film pressure generated with the positioning pin 17.

Figure 3:
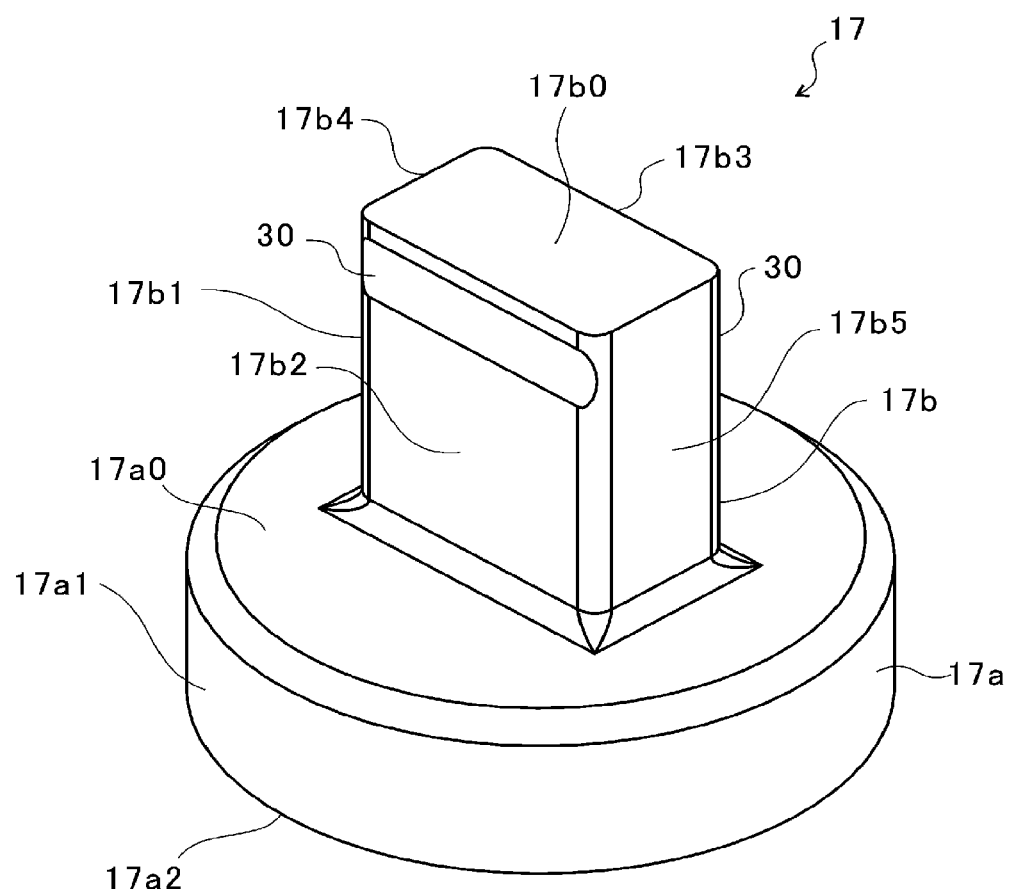
FIG. 3 is a schematic perspective view for illustrating a positioning pin in a first embodiment.

FIG. 3 is a schematic perspective view for illustrating the positioning pin 17 in the first embodiment. The positioning pin 17 has a head portion (position regulating portion) 17a and a pin portion (insertion portion) 17b. The head portion 17a has a circular column shape. The head portion 17a has an upper surface 17a0 having a circular shape, an outer side surface 17a1 having an annular shape, and a bottom surface 17a2 having a circular shape. However, the shape of the head portion 17a is not limited to the circular column shape and may be, for example, a truncated cone shape or a rectangular parallelepiped shape.

The pin portion 17b is provided upright at a center of the upper surface 17a0 of the head portion 17a. The pin portion 17b is formed continuously with the head portion 17a. The pin portion 17b extends in a direction orthogonal to the upper surface 17a0 of the head portion 17a. Thus, a longitudinal direction of the pin portion 17b is orthogonal to the upper surface 17a0 of the head portion 17a.

The pin portion 17b has a rectangular parallelepiped shape (flat plate shape). The pin portion 17b has an upper surface 17b0 having a rectangular shape and an outer side surface 17b1. The outer side surface 17b1 includes flat surfaces 17b2, 17b3, 17b4, and 17b5 each having a rectangular shape. The flat surfaces 17b2 and 17b3 are arranged so as to be orthogonal to the axial direction of the shaft 8. The flat surfaces 17b4 and 17b5 are arranged so as to extend along the axial direction of the shaft 8. However, the pin portion 17b is not limited to the rectangular parallelepiped shape. For example, the pair of flat surfaces 17b4 and 17b5 may be curved surfaces each having an arc shape. The pin portion 17b is only required to have at least the pair of flat surfaces 17b2 and 17b3 in the axial direction. The pin portion 17b has recess portions 30 in the pair of flat surfaces 17b2 and 17b3, respectively. The recess portions 30 in the first embodiment extend parallel to the upper surface 17a0 and the upper surface 17b0. Details of the recess portions 30 are described later.

Figure 4:
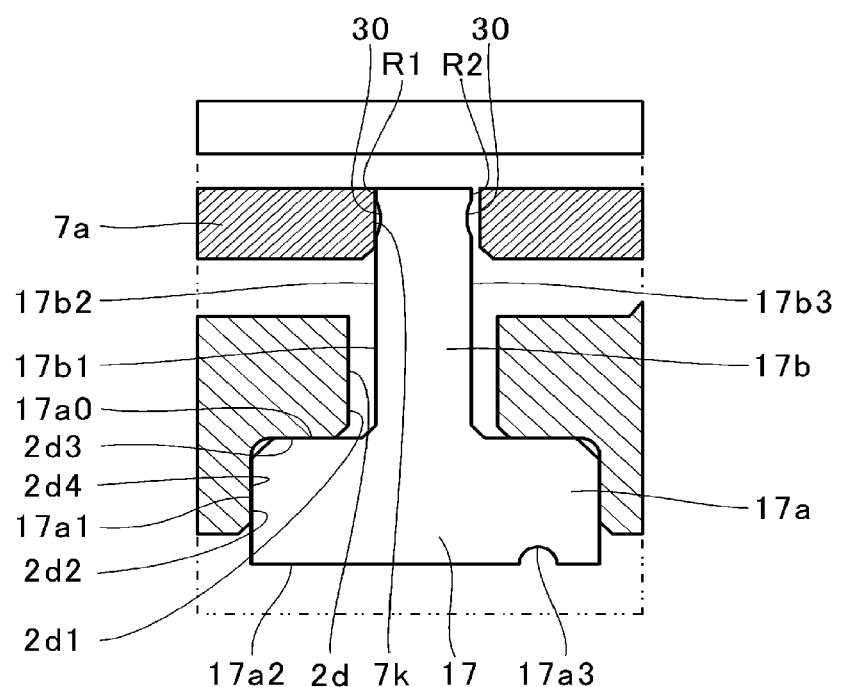
FIG. 4 is an extracted view for illustrating the two-dot chain line portion of FIG. 2.

FIG. 4 is an extracted view for illustrating the two-dot chain line portion of FIG. 2. The through hole 7k of the main body 7a has a shape which is similar to an outer shape of the outer side surface 17b1 of the pin portion 17b. The through hole 7k has a rectangular sectional shape, which is taken along a direction orthogonal to the insertion direction of the positioning pin 17, and a rectangular opening shape.

The pin hole 2d has a small-width portion 2d1 and a large-width portion 2d2. The small-width portion 2d1 communicates with an inside of the bearing hole 2b. The large-width portion 2d2 communicates with an outside of the bearing hole 2b. The small-width portion 2d1 and the large-width portion 2d2 are continuous with each other along the radial direction of the shaft 8. As illustrated in FIG. 4, in the axial direction of the shaft 8 (that is, in a direction orthogonal to the flat surfaces 17b2 and 17b3), a width of the large-width portion 2d2 is larger than a width of the small-width portion 2d1. Moreover, in a direction orthogonal to the flat surfaces 17b4 and 17b5, a width of the large-width portion 2d2 is larger than a width of the small-width portion 2d1.

The small-width portion 2d1 has a shape which is similar to an outer shape of the outer side surface 17b1 of the pin portion 17b. The small-width portion 2d1 has a rectangular sectional shape, which is taken along the direction orthogonal to the insertion direction of the positioning pin 17, and a rectangular opening shape. The large-width portion 2d2 has a shape which is similar to an outer shape of the head portion 17a. The large-width portion 2d2 has a circular sectional shape, which is taken along the direction orthogonal to the insertion direction of the positioning pin 17, and a circular opening shape.

As illustrated in FIG. 4, in the axial direction of the shaft 8 (that is, in the direction orthogonal to the flat surfaces 17b2 and 17b3), a width of the head portion 17a of the positioning pin 17 is larger than a width of the pin portion 17b. Moreover, in the direction orthogonal to the flat surfaces 17b4 and 17b5, a width of the head portion 17a is larger than a width of the pin portion 17b. An area (sectional area) of a cross section orthogonal to a longitudinal direction of the pin portion 17b (extending direction of the pin portion 17b) is larger in the head portion 17a than in the pin portion 17b.

The positioning pin 17 is inserted into the pin hole 2d and the through hole 7k along the radial direction of the shaft 8. At this time, the positioning pin 17 is directed so that the longitudinal direction of the pin portion 17b matches with the radial direction of the shaft 8. When the positioning pin 17 is inserted into the pin hole 2d and the through hole 7k, a distal end portion of the pin portion 17b passes through the large-width portion 2d2 and the small-width portion 2d1 and is inserted into the through hole 7k.

When the positioning pin 17 is inserted into the pin hole 2d and the through hole 7k, the head portion 17a is press-fitted to the large-width portion 2d2. The upper surface 17a0 of the head portion 17a is brought into abutment against a bottom surface 2d3 of the large-width portion 2d2 in the insertion direction of the positioning pin 17. Moreover, the outer side surface 17a1 of the head portion 17a is brought into abutment against an inner peripheral surface 2d4 of the large-width portion 2d2 in the direction orthogonal to the insertion direction of the positioning pin 17. The head portion 17a is brought into abutment against the inner peripheral surface 2d4 of the large-width portion 2d2 over an entire circumference of the head portion 17a. Thus, the large-width portion 2d2 of the pin hole 2d is sealed by the head portion 17a. With this, the head portion 17a is capable of reducing leakage of the lubricating oil inside the bearing hole 2b from the large-width portion 2d2 via the small-width portion 2d1 of the pin hole 2d. Moreover, the head portion 17a is brought into abutment at the upper surface 17a0 thereof against the bottom surface 2d3 of the large-width portion 2d2, thereby being capable of determining a position of the positioning pin 17 in the insertion direction.

In the first embodiment, the outer side surface 17b1 of the pin portion 17b is separated apart from the inner peripheral surface of the small-width portion 2d1. However, the present disclosure is not limited to such a configuration. For example, the outer side surface 17b1 of the pin portion 17b may be brought into abutment against the inner peripheral surface of the small-width portion 2d1.

The head portion 17a has a cutout groove (orientation determination portion) 17a3 formed in the bottom surface 17a2. In other words, the head portion 17a has the cutout groove 17a3 formed in the bottom surface 17a2 which is located on a side opposite to the side of the upper surface 17a0 continuous with the pin portion 17b. The cutout groove 17a3 is a straight groove extending in a predetermined direction. For example, the cutout groove 17a3 extends in a direction orthogonal to the axial direction of the shaft 8 when the positioning pin 17 is inserted into the pin hole 2d and the through hole 7k. However, the present disclosure is not limited to such a configuration. The extending direction of the cutout groove 17*a*3 may be, for example, a direction parallel to the axial direction of the shaft 8.

The extending direction of the cutout groove 17*a*3 is determined in accordance with an orientation of the outer side surface 17*b*1 of the pin portion 17*b* (for example, orientations of the pair of flat surfaces 17*b*2 and 17*b*3). The cutout groove 17*a*3 of the first embodiment extends parallel to the pair of flat surfaces 17*b*2 and 17*b*3. The orientation of the outer side surface 17*b*1 (for example, orientations of the pair of flat surfaces 17*b*2 and 17*b*3) can be determined based on the extending direction of the cutout groove 17*a*3. That is, the cutout groove 17*a*3 functions as an orientation determination portion for determining the orientation of the outer side surface 17*b*1 (for example, orientations of the pair of flat surfaces 17*b*2 and 17*b*3).

However, the orientation determination portion formed in the bottom surface 17*a*2 of the head portion 17*a* is not limited to the cutout groove 17*a*3, and may be formed of, for example, a projection or a mark. Moreover, in the first embodiment, a sectional shape of the cutout groove 17*a*3 taken along a direction parallel to the flat surfaces 17*b*4 and 17*b*5 is an arc shape (U-shape). However, the sectional shape of the cutout groove 17*a*3 is not limited to such a shape, and may be, for example, a V-shape or a rectangular shape.

The bottom surface 17*a*2 (cutout groove 17*a*3) of the head portion 17*a* is imaged by an image sensor (not shown) when the positioning pin 17 is inserted into the pin hole 2*d* and the through hole 7*k*. Image data having been imaged by the image sensor (not shown) is subjected to image processing by an image processor (not shown), and the extending direction of the cutout groove 17*a*3 is identified. A position (orientation) of the positioning pin 17 is adjusted by a position adjusting mechanism (not shown) so that the extending direction of the cutout groove 17*a*3 matches with a predetermined direction (for example, the direction orthogonal to the axial direction of the shaft 8).

Under a state in which the extending direction of the cutout groove 17*a*3 matches with the predetermined direction, the positioning pin 17 is press-fitted to the pin hole 2*d* by the position adjusting mechanism (not shown). With this, the distal end portion of the pin portion 17*b* of the positioning pin 17 is inserted into the through hole 7*k* without colliding with the outer peripheral surface of the main body 7*a*. When the distal end portion of the pin portion 17*b* is inserted into the through hole 7*k*, the flat surface 17*b*2 and the flat surface 17*b*3 of the pin portion 17*b* are flat surfaces being orthogonal to the axial direction of the shaft 8. Moreover, the flat surface 17*b*4 and the flat surface 17*b*5 of the pin portion 17*b* are flat surfaces being parallel to the axial direction of the shaft 8.

When the distal end portion of the pin portion 17*b* is inserted into the through hole 7*k*, the outer side surface 17*b*1 (outer peripheral surface) of the pin portion 17*b* is opposed to the inner peripheral surface of the through hole 7*k*. The recess portions 30 are formed at the distal end portion of the pin portion 17*b*. The recess portions 30 are opposed to the inner peripheral surface of the through hole 7*k*. That is, the recess portions 30 are formed in regions (first opposed surfaces) R1 and R2, which are located on the outer side surface 17*b*1 of the pin portion 17*b* and are opposed to the inner peripheral surface of the through hole 7*k* in the axial direction of the shaft 8. The recess portions 30 are formed in the flat surface 17*b*2 and the flat surface 17*b*3 of the pin portion 17*b*. The recess portions 30 are each recessed in a separating direction of separating apart from the inner peripheral surface of the through hole 7*k* of the main body 7*a*.

Figure 5A:
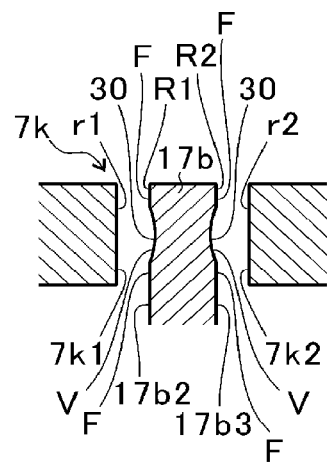
FIG. 5A is an explanatory schematic sectional view for illustrating shapes of a pin portion and a through hole in the first embodiment.

FIG. 5A is an explanatory schematic sectional view for illustrating shapes of the pin portion 17*b* and the through hole 7*k* in the first embodiment. In FIG. 5A, sectional shapes of the pin portion 17*b* and the through hole 7*k* on a cross section including a center axis of the shaft 8 are illustrated.

As illustrated in FIG. 5A, the pin portion 17*b* has the pair of flat surfaces 17*b*2 and 17*b*3 arranged in the axial direction of the shaft 8. The flat surface 17*b*2 is located on the turbine impeller 9 side in the axial direction of the shaft 8. The flat surface 17*b*3 is located on the compressor impeller 10 side in the axial direction of the shaft 8. Moreover, the through hole 7*k* has a pair of flat surfaces 7*k*1 and 7*k*2 arranged in the axial direction of the shaft 8. The pair of flat surfaces 7*k*1 and 7*k*2 are opposed to the pair of flat surfaces 17*b*2 and 17*b*3 in the axial direction of the shaft 8. The flat surface 17*b*2 of the pin portion 17*b* has the region (first opposed surface) R1 opposed to the flat surface 7*k*1 of the through hole 7*k*. The flat surface 17*b*3 of the pin portion 17*b* has the region (first opposed surface) R2 opposed to the flat surface 7*k*2 of the through hole 7*k*. Moreover, the flat surface 7*k*1 of the through hole 7*k* has a region (second opposed surface) r1 opposed to the region (first opposed surface) R1 of the flat surface 17*b*2 of the pin portion 17*b*. The flat surface 7*k*2 of the through hole 7*k* has a region (second opposed surface) r2 opposed to the region (first opposed surface) R2 of the flat surface 17*b*3 of the pin portion 17*b*.

The region R1 and the region R2 each have the recess portion 30 and flat surface portions F. That is, in the regions R1 and R2, the pair of recess portions 30 and a pair of flat surface portions F are formed. The flat surface portions F each have a flat surface shape. The recess portions 30 are each recessed in the separating direction in which the region R1 (R2) and the region r1 (r2) separate apart from each other. The pair of recess portions 30 are straight grooves extending parallel to the upper surface 17*a*0. A sectional shape of each of the pair of recess portions 30 parallel to the flat surfaces 17*b*4 and 17*b*5 is an arc shape. Thus, the recess portions 30 each have a variation portion V in which a recess amount in the separating direction of separating apart from the inner peripheral surface of the through hole 7*k* continuously varies.

As described above, the positioning pin 17 receives a thrust load applied to the both end surfaces 7*m* of the main body 7*a*. Moreover, vibrations of a prime mover (for example, engine) (not shown) are transmitted to the positioning pin 17 via the bearing housing 2. Therefore, the positioning pin 17 receives the thrust load while being vibrated by the vibrations of the prime mover (not shown). When the positioning pin 17 receives the thrust load while being vibrated, the positioning pin 17 may be brought into contact with the semi-floating bearing 7. Here, when the through hole 7*k* of the semi-floating bearing 7 has a circular shape, and the pin portion 17*b* of the positioning pin 17 has a circular column shape, the contact between the through hole 7*k* and the positioning pin 17 is local contact (Hertzian contact). When the contact between the through hole 7*k* and the positioning pin 17 is the Hertzian contact, stress generated at a contact portion between the through hole 7*k* and the positioning pin 17 is high. Thus, there is a fear in that the contact portion between the through hole 7*k* and the positioning pin 17 is excessively worn.

The through hole 7*k* of the semi-floating bearing 7 in the first embodiment has the flat surfaces 7*k*1 and 7*k*2 in the regions r1 and r2 opposed to the pin portion 17*b* of the positioning pin 17. Moreover, the pin portion 17b of the positioning pin 17 has the flat surface portions F in the regions R1 and R2 opposed to the through hole 7k. With this, the contact between the positioning pin 17 and the through hole 7k is flat-surface contact. When the contact of the positioning pin 17 with the through hole 7k is the flat-surface contact, a contact area of the positioning pin 17 can be set larger than a contact area given in the case of the local contact (Hertzian contact). Thus, the stress generated at the contact portion between the positioning pin 17 and the through hole 7k can be suppressed.

Moreover, the lubricating oil is supplied between the through hole 7k of the semi-floating bearing 7 and the pin portion 17b of the positioning pin 17. When the lubricating oil is supplied between the through hole 7k and the pin portion 17b, an oil film is formed between the through hole 7k and the pin portion 17b. When the through hole 7k and the pin portion 17b move in a direction of approaching relative to each other, a thickness of the oil film changes so as to be become smaller as time elapses. At this time, the lubricating oil generates pressure in the direction of separating the positioning pin 17 and the semi-floating bearing 7 apart from each other owing to a so-called squeeze effect which is attained with a change in thickness of the oil film.

Moreover, the pin portion 17b of the positioning pin 17 has the recess portions 30 each having an arc shape in the regions R1 and R2 opposed to the through hole 7k. An opposing distance between the through hole 7k and each of the recess portions 30 varies along the longitudinal direction of the pin portion 17b. That is, the recess portions 30 each have the variation portion V along which the opposing distance between the through hole 7k and the pin portion 17b varies. Here, when the positioning pin 17 is vibrated by the vibrations of the prime mover (not shown), the positioning pin 17 moves in the axial direction of the shaft 8 or in the rotation direction of the shaft 8. When the positioning pin 17 moves, a relative speed between the lubricating oil forming the oil film and the positioning pin 17 changes. At this time, owing to the relative speed between the lubricating oil and the positioning pin 17 and a so-called wedge effect attained with the variation portion V, the lubricating oil generates pressure in the direction of separating the positioning pin 17 and the semi-floating bearing 7 apart from each other.

Owing to the flat-surface contact, the squeeze effect, and the wedge effect, the stress generated at the contact portion between the positioning pin 17 and the through hole 7k can be suppressed. When the stress generated at the contact portion between the positioning pin 17 and the through hole 7k is suppressed, the wear at the contact portion is reduced.

Figure 5C:
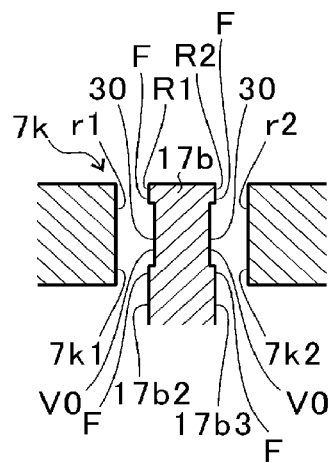
FIG. 5C is an explanatory schematic sectional view for illustrating shapes of the pin portion and the through hole in a second embodiment.
Figure 5E:
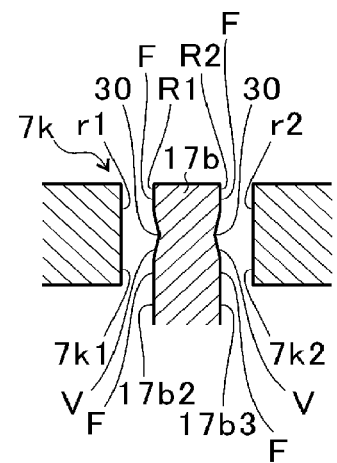
FIG. 5E is an explanatory schematic sectional view for illustrating shapes of the pin portion and the through hole in a third embodiment.
Figure 5B:
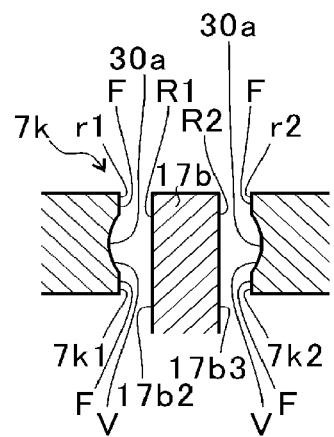
FIG. 5B is an explanatory schematic sectional view for illustrating shapes of the pin portion and the through hole in a first modification example.

FIG. 5B is an explanatory schematic sectional view for illustrating shapes of the pin portion 17b and the through hole 7k in the first modification example. In FIG. 5B, sectional shapes of the pin portion 17b and the through hole 7k on a cross section including a center axis of the shaft 8 are illustrated. In the first modification example, the recess portions 30 are not formed in the pin portion 17b of the positioning pin 17. Thus, the flat surfaces 17b2 and 17b3 of the pin portion 17b each have a flat surface shape in the regions R1 and R2. Instead, the semi-floating bearing 7 in the first modification example has recess portions 30a in the through hole 7k. The recess portions 30a are formed in the regions (second opposed surfaces) r1 and r2, which are located on the inner peripheral surface of the through hole 7k and are opposed to the outer peripheral surface of the pin portion 17b in the axial direction. That is, the recess portions 30a are formed in the pair of flat surfaces 7k1 and 7k2 arranged in the axial direction of the through hole 7k. The recess portions 30a are each recessed in the separating direction of separating apart from the outer peripheral surface of the pin portion 17b.

As illustrated in FIG. 5B, the flat surface 7k1 of the through hole 7k has the region (second opposed surface) r1 opposed to the region (first opposed surface) R1 of the flat surface 17b2 of the pin portion 17b. The flat surface 7k2 of the through hole 7k has the region (second opposed surface) r2 opposed to the region (first opposed surface) R2 of the flat surface 17b3 of the pin portion 17b.

The region r1 and the region r2 each have the recess portion 30a and the flat surface portions F. That is, in the regions r1 and r2, the pair of recess portions 30a and the pair of flat surface portions F are formed. The flat surface portions F each have a flat surface shape. The recess portions 30a are recessed in the separating direction in which the regions R1 and R2 and the regions r1 and r2 separate apart from each other. The pair of recess portions 30a are straight grooves extending parallel to the upper surface 17a0. A sectional shape of each of the pair of recess portions 30a parallel to the flat surfaces 17b4 and 17b5 is an arc shape. Thus, the recess portions 30a each have the variation portion V in which a recess amount in the separating direction of separating apart from the outer peripheral surface of the pin portion 17b continuously varies.

Figure 5D:
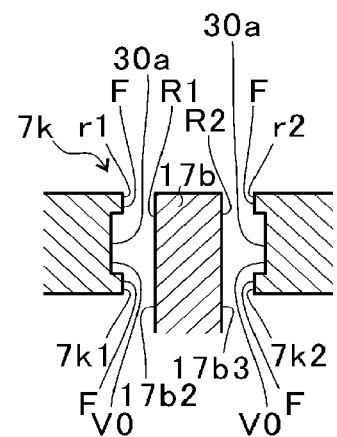
FIG. 5D is an explanatory schematic sectional view for illustrating shapes of the pin portion and the through hole in a second modification example.

When the recess portions 30a are formed in the flat surfaces 7k1 and 7k2 (regions r1 and r2) of the through hole 7k as in the first modification example, the same effect as the first embodiment described above can be attained. In the first embodiment and the first modification example described above, the recess portions 30, 30a are each formed as the straight groove having the sectional shape of an arc-shape. However, the shape of the recess portions 30, 30a is not limited to such a shape. The recess portions 30, 30a may each be a straight groove having a rectangular shape as illustrated in FIG. 5C and FIG. 5D. FIG. 5C is an explanatory schematic sectional view for illustrating shapes of the pin portion 17b and the through hole 7k in a second embodiment. FIG. 5D is an explanatory schematic sectional view for illustrating shapes of the pin portion 17b and the through hole 7k in a second modification example. In FIG. 5C and FIG. 5D, sectional shapes of the pin portion 17b and the through hole 7k on a cross section including the center axis of the shaft 8 are illustrated.

In FIG. 5C, the region R1 and the region R2 each have the recess portions 30 and the flat surface portions F. The flat surface portions F each have a flat surface shape. The recess portions 30 are each recessed in the separating direction in which the region R1 (R2) and the region r1 (r2) separate apart from each other. The pair of recess portions 30 are straight grooves extending parallel to the upper surface 17a0. A sectional shape of each of the recess portions 30 parallel to the flat surfaces 17b4 and 17b5 is a rectangular shape. Thus, the recess portions 30 each have a variation portion V0 in which a recess amount in the separating direction of separating apart from the inner peripheral surface of the through hole 7k is constant.

In FIG. 5D, the region r1 and the region r2 each have the recess portions 30a and the flat surface portions F. The flat surface portions F each have a flat surface shape. The recess portions 30a are each recessed in the separating direction in which the region R1, R2 and the region r1, r2 separate apart from each other. The pair of recess portions 30a are straight grooves extending parallel to the upper surface 17a0. A sectional shape of each of the recess portions 30a parallel to the flat surfaces 17b4 and 17b5 is a rectangular shape. Thus, the recess portions 30a each have a variation portion V0 in which a recess amount in the separating direction of separating apart from the outer peripheral surface of the pin portion 17*b* is constant.

Figure 5F:
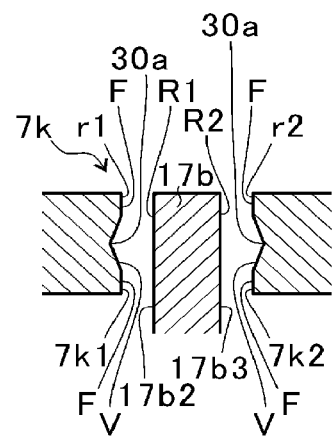
FIG. 5F is an explanatory schematic sectional view for illustrating shapes of the pin portion and the through hole in a third modification example.

When the recess portions 30, 30*a* are formed in the regions R1, R2, r1, and r2 as in the second embodiment and the second modification example, the same effect as the first embodiment described above can be attained. In the second embodiment and the second modification example, the recess portions 30, 30*a* are each formed as the straight groove having the sectional shape of a rectangular shape. However, the shape of the recess portions 30, 30*a* is not limited to such a shape. The recess portions 30, 30*a* may each be a straight groove having a triangular shape (tapered shape) as illustrated in FIG. 5E and FIG. 5F. FIG. 5E is an explanatory schematic sectional view for illustrating shapes of the pin portion 17*b* and the through hole 7*k* in a third embodiment. FIG. 5F is an explanatory schematic sectional view for illustrating shapes of the pin portion 17*b* and the through hole 7*k* in a third modification example. In FIG. 5E and FIG. 5F, sectional shapes of the pin portion 17*b* and the through hole 7*k* on a cross section including the center axis of the shaft 8 are illustrated.

In FIG. 5E, the region R1 and the region R2 each have the recess portions 30 and the flat surface portions F. The flat surface portions F each have a flat surface shape. The recess portions 30 are each recessed in the separating direction in which the region R1 (R2) and the region r1 (r2) separate apart from each other. The pair of recess portions 30 are straight grooves extending parallel to the upper surface 17*a*0. A sectional shape of each of the recess portions 30 parallel to the flat surfaces 17*b*4 and 17*b*5 is a triangular shape (tapered shape). Thus, the recess portions 30 each have a variation portion V in which a recess amount in the separating direction of separating apart from the inner peripheral surface of the through hole 7*k* continuously varies.

In FIG. 5F, the region r1 and the region r2 each have the recess portions 30*a* and the flat surface portions F. The flat surface portions F each have a flat surface shape. The recess portions 30*a* are each recessed in the separating direction in which the region R1, R2 and the region r1, r2 separate apart from each other. The pair of recess portions 30*a* are straight grooves extending parallel to the upper surface 17*a*0. A sectional shape of each of the recess portions 30*a* parallel to the flat surfaces 17*b*4 and 17*b*5 is a triangular shape (tapered shape). Thus, the recess portions 30*a* each have a variation portion V in which a recess amount in the separating direction of separating apart from the outer peripheral surface of the pin portion 17*b* continuously varies.

When the recess portions 30, 30*a* are formed in the regions R1, R2, r1, and r2 as in the third embodiment and the third modification example, the same effect as the first embodiment described above can be attained. In the third embodiment and the third modification example, the recess portions 30, 30*a* are each formed as the straight groove having the sectional shape of a triangular shape (tapered shape). However, the shape of the recess portions 30, 30*a* is not limited to such a shape. However, the recess portions 30, 30*a* are not limited to the straight grooves and may be, for example, curved grooves. Moreover, the recess portions 30, 30*a* are not limited to grooves and may be, for example, semi-spherical recesses.

Figure 6A:
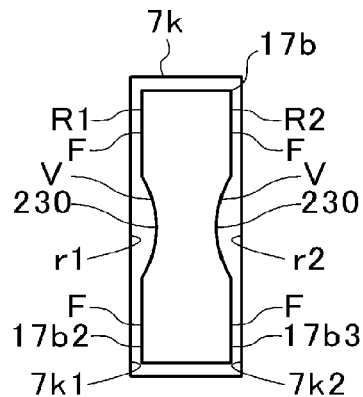
FIG. 6A is a schematic top view for illustrating shapes of the pin portion and the through hole in a fourth embodiment.

FIG. 6A is a schematic top view for illustrating shapes of the pin portion 17*b* and the through hole 7*k* in a fourth embodiment. In FIG. 6A, shapes of the pin portion 17*b* and the through hole 7*k* as seen from a distal end side in the insertion direction of the positioning pin 17 are illustrated.

As illustrated in FIG. 6A, the pin portion 17*b* has the pair of flat surfaces 17*b*2 and 17*b*3 arranged in the axial direction of the shaft 8. Moreover, the through hole 7*k* has a pair of flat surfaces 7*k*1 and 7*k*2 arranged in the axial direction of the shaft 8. The flat surface 17*b*2 of the pin portion 17*b* has the region (first opposed surface) R1 opposed to the flat surface 7*k*1 of the through hole 7*k*. The flat surface 17*b*3 of the pin portion 17*b* has the region (first opposed surface) R2 opposed to the flat surface 7*k*2 of the through hole 7*k*. Moreover, the flat surface 7*k*1 of the through hole 7*k* has a region (second opposed surface) r1 opposed to the region (first opposed surface) R1 of the flat surface 17*b*2 of the pin portion 17*b*. The flat surface 7*k*2 of the through hole 7*k* has a region (second opposed surface) r2 opposed to the region (first opposed surface) R2 of the flat surface 17*b*3 of the pin portion 17*b*.

The region R1 and the region R2 each have the recess portion 230 and flat surface portions F. That is, in the regions R1 and R2, the pair of recess portions 230 and a pair of flat surface portions F are formed. The flat surface portions F each have a flat surface shape. The recess portions 230 are each recessed in the separating direction in which the region R1 (R2) and the region r1 (r2) separate apart from each other. The pair of recess portions 230 are straight grooves extending parallel to the flat surfaces 17*b*4 and 17*b*5. A sectional shape of each of the pair of recess portions 230 parallel to the upper surface 17*b*0 is an arc shape. Thus, the recess portions 230 each have a variation portion V in which a recess amount in the separating direction of separating apart from the inner peripheral surface of the through hole 7*k* continuously varies. When the recess portions 230 are formed in the flat surfaces 17*b*2 and 17*b*3 of the pin portion 17*b* as in the fourth embodiment, the same effect as the first embodiment described above can be attained.

Figure 6C:
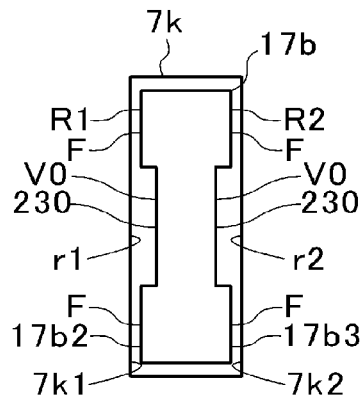
FIG. 6C is a schematic top view for illustrating shapes of the pin portion and the through hole in a fifth embodiment.
Figure 6E:
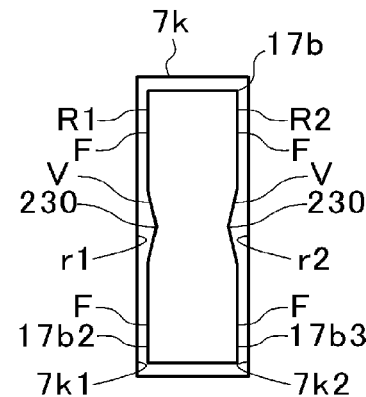
FIG. 6E is a schematic top view for illustrating shapes of the pin portion and the through hole in a sixth embodiment.
Figure 6B:
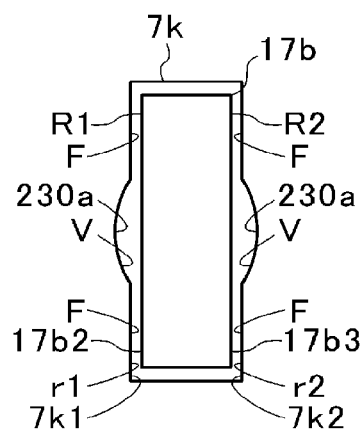
FIG. 6B is a schematic top view for illustrating shapes of the pin portion and the through hole in a fourth modification example.

FIG. 6B is a schematic top view for illustrating shapes of the pin portion 17*b* and the through hole 7*k* in the fourth modification example. In FIG. 6B, shapes of the pin portion 17*b* and the through hole 7*k* as seen from the distal end side in the insertion direction of the positioning pin 17 are illustrated. In the fourth modification example, the recess portions 230 are not formed in the pin portion 17*b* of the positioning pin 17. Thus, the flat surfaces 17*b*2 and 17*b*3 of the pin portion 17*b* each have a flat surface shape in the regions R1 and R2. Instead, the semi-floating bearing 7 in the fourth modification example has recess portions 230*a* in the through hole 7*k*. The recess portions 230*a* are formed in the regions (second opposed surfaces) r1 and r2, which are located on the inner peripheral surface of the through hole 7*k* and are opposed to the outer peripheral surface of the pin portion 17*b* in the axial direction. That is, the recess portions 230*a* are formed in the pair of flat surfaces 7*k*1 and 7*k*2 arranged in the axial direction of the through hole 7*k*. The recess portions 230*a* are each recessed in the separating direction of separating apart from the outer peripheral surface of the pin portion 17*b*.

As illustrated in FIG. 6B, the flat surface 7*k*1 of the through hole 7*k* has a region (second opposed surface) r1 opposed to the region (first opposed surface) R1 of the flat surface 17*b*2 of the pin portion 17*b*. The flat surface 7*k*2 of the through hole 7*k* has a region (second opposed surface) r2 opposed to the region (first opposed surface) R2 of the flat surface 17*b*3 of the pin portion 17*b*.

The region r1 and the region r2 each have the recess portion 230*a* and flat surface portions F. That is, in the regions r1 and r2, the pair of recess portions 230*a* and a pair of flat surface portions F are formed. The flat surface portions F each have a flat surface shape. The recess portions 230a are each recessed in the separating direction in which the region R1 (R2) and the region r1 (r2) separate apart from each other. The pair of recess portions 230a are straight grooves extending parallel to the flat surface 17b4 and 17b5. A sectional shape of each of the pair of recess portions 230a parallel to the upper surface 17b0 is an arc shape. Thus, the recess portions 230a each have a variation portion V in which a recess amount in the separating direction of separating apart from the outer peripheral surface of the pin portion 17b continuously varies.

Figure 6D:
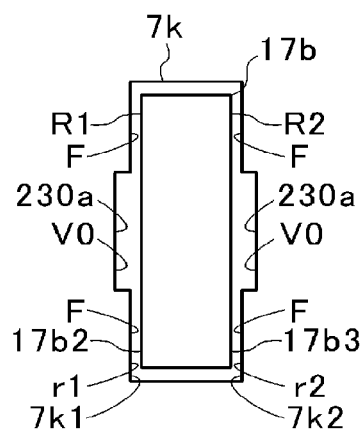
FIG. 6D is a schematic top view for illustrating shapes of the pin portion and the through hole in a fifth modification example.

When the recess portions 230a are formed in the flat surfaces 7k1 and 7k2 of the through hole 7k as in the fourth modification example, the same effect as the first embodiment described above can be attained. In the fourth embodiment and the fourth modification example described above, the recess portions 230, 230a are each formed as the straight groove having the sectional shape of an arc shape. However, the shape of the recess portions 230, 230a is not limited to such a shape. The recess portions 230, 230a may each be a straight groove having a rectangular shape as illustrated in FIG. 6C and FIG. 6D. FIG. 6C is a schematic top view for illustrating shapes of the pin portion 17b and the through hole 7k in a fifth embodiment. FIG. 6D is a schematic top view for illustrating shapes of the pin portion 17b and the through hole 7k in a fifth modification example. In FIG. 6C and FIG. 6D, shapes of the pin portion 17b and the through hole 7k as seen from the distal end side in the insertion direction of the positioning pin 17 are illustrated.

In FIG. 6C, the region R1 and the region R2 each have the recess portions 230 and the flat surface portions F. The flat surface portions F each have a flat surface shape. The recess portions 230 are each recessed in the separating direction in which the region R1 (R2) and the region r1 (r2) separate apart from each other. The pair of recess portions 230 are straight grooves extending parallel to the flat surfaces 17b4 and 17b5. A sectional shape of each of the pair of recess portions 230 parallel to the upper surface 17b0 is a rectangular shape. Thus, the recess portions 230 each have the variation portion V0 in which a recess amount in the separating direction of separating apart from the inner peripheral surface of the through hole 7k is constant.

In FIG. 6D, the region r1 and the region r2 each have the recess portions 230a and the flat surface portions F. The flat surface portions F each have a flat surface shape. The recess portions 230a are each recessed in the separating direction in which the region R1 (R2) and the region r1 (r2) separate apart from each other. The pair of recess portions 230a are straight grooves extending parallel to the flat surfaces 17b4 and 17b5. A sectional shape of each of the pair of recess portions 230a parallel to the upper surface 17b0 is a rectangular shape. Thus, the recess portions 230a each have the variation portion V0 in which a recess amount in the separating direction of separating apart from the outer peripheral surface of the pin portion 17b is constant.

Figure 6F:
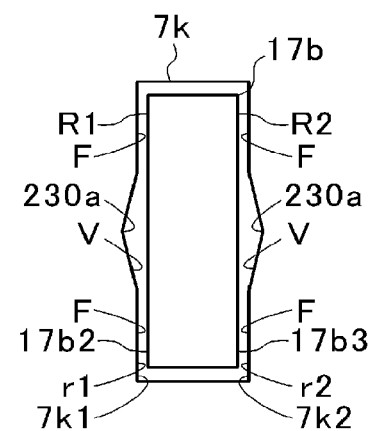
FIG. 6F is a schematic top view for illustrating shapes of the pin portion and the through hole in a sixth modification example.

When the recess portions 230, 230a are formed in the region R1 (R2) and the region r1 (r2) as in the fifth embodiment and the fifth modification example, the same effect as the first embodiment described above can be attained. In the fifth embodiment and the fifth modification example described above, the recess portions 230, 230a are each formed as the straight groove having the sectional shape of a rectangular shape. However, the shape of the recess portions 230, 230a is not limited to such a shape. The recess portions 230, 230a may each be a straight groove having a triangular shape (tapered shape) as illustrated in FIG. 6E and FIG. 6F. FIG. 6E is a schematic top view for illustrating shapes of the pin portion 17b and the through hole 7k in a sixth embodiment. FIG. 6F is a schematic top view for illustrating shapes of the pin portion 17b and the through hole 7k in a sixth modification example. In FIG. 6E and FIG. 6F, shapes of the pin portion 17b and the through hole 7k as seen from the distal end side in the insertion direction of the positioning pin 17 are illustrated.

In FIG. 6E, the region R1 and the region R2 each have the recess portions 230 and the flat surface portions F. The flat surface portions F each have a flat surface shape. The recess portions 230 are each recessed in the separating direction in which the region R1 (R2) and the region r1 (r2) separate apart from each other. The pair of recess portions 230 are straight grooves extending parallel to the flat surfaces 17b4 and 17b5. A sectional shape of each of the pair of recess portions 230 parallel to the upper surface 17b0 is a triangular shape (tapered shape). Thus, the recess portions 230 each have the variation portion V in which a recess amount in the separating direction of separating apart from the inner peripheral surface of the through hole 7k continuously varies.

In FIG. 6F, the region r1 and the region r2 each have the recess portions 230a and the flat surface portions F. The flat surface portions F each have a flat surface shape. The recess portions 230a are each recessed in the separating direction in which the region R1 (R2) and the region r1 (r2) separate apart from each other. The pair of recess portions 230a are straight grooves extending parallel to the flat surfaces 17b4 and 17b5. A sectional shape of each of the pair of recess portions 230a parallel to the upper surface 17b0 is a triangular shape (tapered shape). Thus, the recess portions 230a each have the variation portion V in which a recess amount in the separating direction of separating apart from the outer peripheral surface of the pin portion 17b continuously varies.

When the recess portions 230, 230a are formed in the regions R1, R2, r1, and r2 as in the sixth embodiment and the sixth modification example, the same effect as the first embodiment described above can be attained. In the sixth embodiment and the sixth modification example, the recess portions 230, 230a are each formed as the straight groove having a triangular shape (tapered shape) in cross section. However, the recess portions 230, 230a are not limited to the straight grooves. For example, the recess portions 230, 230a may be curved grooves. Moreover, the recess portions 230, 230a are not limited to grooves and may be, for example, semi-spherical recesses.

In the embodiments and modification examples described above, the examples in which the recess portions are formed in opposed surfaces of one of the regions R1 and R2 (hereinafter also referred to as "first opposed surfaces") and the regions r1 and r2 (hereinafter also referred to as "second opposed surfaces") have been described. However, the present disclosure is not limited to such examples. The recess portions may be formed in both of the first opposed surfaces and the second opposed surfaces. That is, the recess portions may be formed in opposed surfaces of at least one of the first opposed surfaces or the second opposed surfaces.

Moreover, in the embodiments described above, the examples in which the recess portions 30, 230 are formed in both of the flat surfaces 17b2 and the flat surfaces 17b3 of the pin portion 17b have been described. Moreover, in the modification examples described above, the examples in which the recess portions 30a, 230a are formed in both of the flat surfaces 7k1 and the flat surfaces 7k2 of the through hole 7k have been described. However, the present disclosure is not limited to such examples. For example, the recess portions 30, 230 may be formed only in the flat surface 17b2 of the pin portion 17b. Moreover, the recess portions 30a, 230a may be formed only in the flat surface 7k1 of the through hole 7k. That is, the recess portions 30, 230 may be formed in at least one of the flat surface 17b2 or the flat surface 17b3 of the pin portion 17b. Moreover, the recess portions 30a, 230a may be formed in at least one of the flat surface 7k1 or the flat surface 7k2 of the through hole 7k.

Moreover, in the embodiments described above, the examples in which the single (one) recess portion 30, 230 is formed in the region R1 or the region R2 of the pin portion 17b have been described. Moreover, in the modification examples described above, the examples in which the single (one) recess portion 30a, 230a is formed in the region r1 or the region r2 of the through hole 7k have been described. However, the present disclosure is not limited to such examples. A plurality of (for example, two) recess portions 30, 230 may be formed in the region R1 or the region R2 of the pin portion 17b. Moreover, a plurality of (for example, two) recess portions 30a, 230a may be formed in the region r1 or the region r2 of the through hole 7k.

Figure 7A:
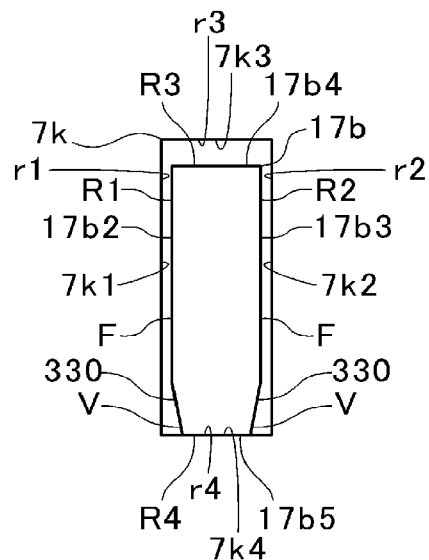
FIG. 7A is a schematic top view for illustrating shapes of the pin portion and the through hole in a seventh embodiment.

FIG. 7A is a schematic top view for illustrating shapes of the pin portion 17b and the through hole 7k in a seventh embodiment. In FIG. 7A, shapes of the pin portion 17b and the through hole 7k as seen from the distal end side in the insertion direction of the positioning pin 17 are illustrated. As illustrated in FIG. 7A, the pin portion 17b has the pair of flat surfaces 17b2 and 17b3 arranged in the axial direction of the shaft 8. Moreover, the through hole 7k has a pair of flat surfaces 7k1 and 7k2 arranged in the axial direction of the shaft 8. The flat surface 17b2 of the pin portion 17b has the region (first opposed surface) R1 opposed to the flat surface 7k1 of the through hole 7k. The flat surface 17b3 of the pin portion 17b has the region (first opposed surface) R2 opposed to the flat surface 7k2 of the through hole 7k. Moreover, the flat surface 7k1 of the through hole 7k has a region (second opposed surface) r1 opposed to the region (first opposed surface) R1 of the flat surface 17b2 of the pin portion 17b. The flat surface 7k2 of the through hole 7k has a region (second opposed surface) r2 opposed to the region (first opposed surface) R2 of the flat surface 17b3 of the pin portion 17b.

Further, the pin portion 17b has the pair of flat surfaces 17b4 and 17b5 arranged in the rotation direction of the shaft 8. The through hole 7k has a pair of flat surfaces 7k3 and 7k4 arranged in the rotation direction of the shaft 8. The flat surface 17b4 of the pin portion 17b has the region R3 opposed to the flat surface 7k3 of the through hole 7k. The flat surface 17b5 of the pin portion 17b has the region R4 opposed to the flat surface 7k4 of the through hole 7k. The flat surface 7k3 of the through hole 7k has a region r3 opposed to the region R3 of the flat surface 17b4 of the pin portion 17b. The flat surface 7k4 of the through hole 7k has a region r4 opposed to the region R4 of the flat surface 17b5 of the pin portion 17b.

The region R1 and the region R2 each have the recess portion 330 and flat surface portions F. That is, in the regions R1 and R2, the pair of recess portions 330 and a pair of flat surface portions F are formed. The flat surface portions F each have a flat surface shape. The recess portions 330 are each recessed in the separating direction in which the region R1 (R2) and the region r1 (r2) separate apart from each other. The recess portions 330 are formed at end portions of the region R1 and the region R2 on an upstream side in the rotation direction of the shaft 8. The flat surface portions F are formed at end portions of the region R1 and the region R2 on a downstream side in the rotation direction of the shaft 8. The flat surface portions F are adjacent to the recess portions 330 in the rotation direction of the shaft 8. The pair of recess portions 330 are each a cutout having a tapered shape. Thus, the recess portions 330 each have the variation portion V in which a recess amount in the separating direction of separating apart from the inner peripheral surface of the through hole 7k continuously varies. An opposing distance between the through hole 7k and the recess portion 330 varies along the rotation direction of the shaft 8. The opposing distance between the through hole 7k and the recess portion 330 increases as approaching the upstream side in the rotation direction of the shaft 8.

When the shaft 8 rotates, the lubricating oil in the bearing hole 2b rotates in the same direction as the rotation direction of the shaft 8. When the lubricating oil rotates, the semi-floating bearing 7 is forced to rotate in the same direction as the rotation direction of the lubricating oil. However, the movement of the semi-floating bearing 7 in the rotation direction of the shaft 8 is regulated by the positioning pin 17. Thus, the semi-floating bearing 7 maintains the state in which the flat surface 7k4 of the through hole 7k is pressed by the flat surface 17b5 of the pin portion 17b. At this time, movement of the lubricating oil in the recess portions 330 toward the upstream side in the rotation direction of the shaft 8 is restricted. When the through hole 7k and the pin portion 17b move in the direction of relatively approaching each other under the state in which the movement of the lubricating oil is restricted, pressure of the lubricating oil in the recess portions 330 increases. With the increase in pressure of the lubricating oil in the recess portions 330, the stress generated at the contact portion between the positioning pin 17 and the through hole 7k can be suppressed. Moreover, when the recess portions 330 are formed in the flat surfaces 17b2 and 17b3 of the pin portion 17b as in the seventh embodiment, the same effect as the first embodiment described above can be attained.

Figure 7B:
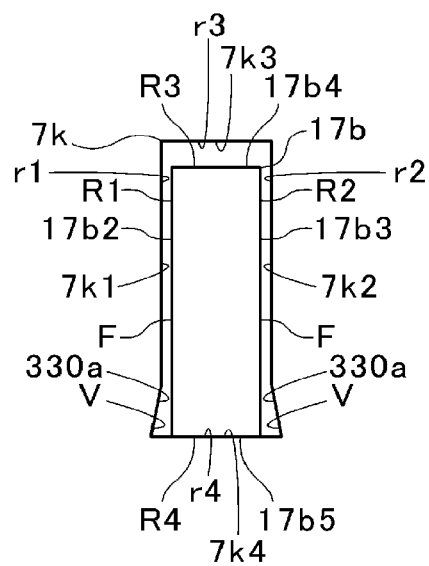
FIG. 7B is a schematic top view for illustrating shapes of the pin portion and the through hole in a seventh modification example.

FIG. 7B is a schematic top view for illustrating shapes of the pin portion 17b and the through hole 7k in a seventh modification example. In FIG. 7B, shapes of the pin portion 17b and the through hole 7k as seen from the distal end side in the insertion direction of the positioning pin 17 are illustrated. In the seventh modification example, the recess portions 330 are not formed in the pin portion 17b of the positioning pin 17. Thus, the flat surfaces 17b2 and 17b3 of the pin portion 17b each have a flat surface shape in the regions R1 and R2. Instead, the semi-floating bearing 7 in the seventh modification example has recess portions 330a in the through hole 7k. The recess portions 330a are formed in the regions (second opposed surfaces) r1 and r2, which are located on the inner peripheral surface of the through hole 7k and are opposed to the outer peripheral surface of the pin portion 17b in the axial direction. That is, the recess portions 330a are formed in the pair of flat surfaces 7k1 and 7k2 arranged in the axial direction of the through hole 7k. The recess portions 330a are each recessed in the separating direction of separating apart from the outer peripheral surface of the pin portion 17b.

As illustrated in FIG. 7B, the flat surface 7k1 of the through hole 7k has the region (second opposed surface) r1 opposed to the region (first opposed surface) R1 of the flat surface 17b2 of the pin portion 17b. The flat surface 7k2 of the through hole 7k has the region (second opposed surface) r2 opposed to the region (first opposed surface) R2 of the flat surface 17b3 of the pin portion 17b.

The region r1 and the region r2 each have the recess portion 330a and the flat surface portions F. That is, in the regions r1 and r2, the pair of recess portions 330a and the pair of flat surface portions F are formed. The flat surface portions F each have a flat surface shape. The recess 330a is recessed in a separating direction in which the region R1 (R2) and the region r1 (r2) separate apart from each other. The recess portions 330a are formed at end portions of the region r1 and the region r2 on an upstream side in the rotation direction of the shaft 8. The flat surface portions F are formed at end portions of the region r1 and the region r2 on a downstream side in the rotation direction of the shaft 8. The flat surface portions F are adjacent to the recess portions 330a in the rotation direction of the shaft 8. The pair of recess portions 330a are each a cutout having a tapered shape. Thus, the recess portions 330a each have the variation portion V in which a recess amount in the separating direction of separating apart from the outer peripheral surface of the pin portion 17b continuously varies. An opposing distance between the pin portion 17b and the recess portion 330a varies along the rotation direction of the shaft 8. The opposing distance between the pin portion 17b and the recess portion 330a increases as approaching the upstream side in the rotation direction of the shaft 8. When the recess portions 330a are formed in the flat surfaces 7k1 and 7k2 of the through hole 7k as in the seventh modification example, the same effect as the first embodiment described above can be attained.

Figure 8:
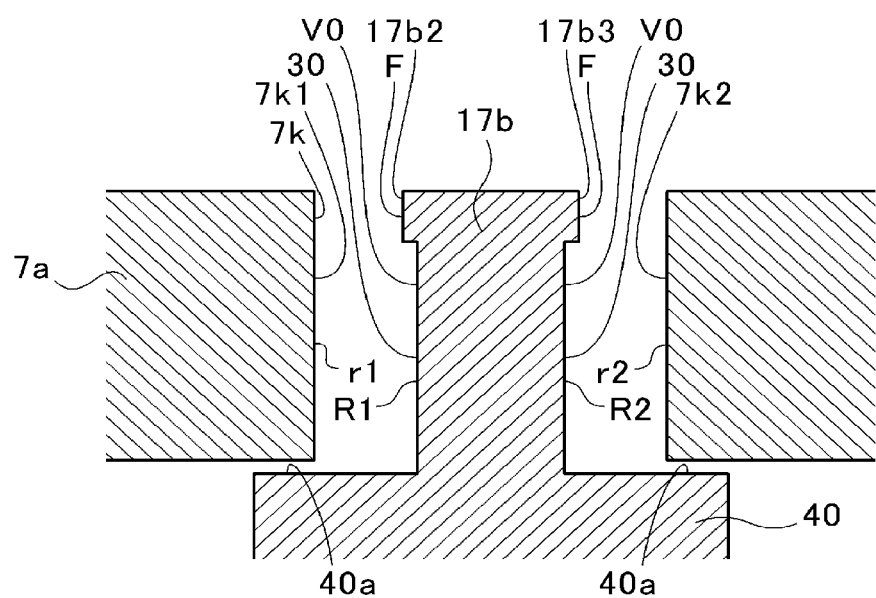
FIG. 8 is an explanatory schematic sectional view for illustrating shapes of the pin portion and the through hole in an eighth embodiment.

FIG. 8 is a schematic sectional view for illustrating shapes of the pin portion 17b and the through hole 7k in an eighth embodiment. In FIG. 8, sectional shapes of the pin portion 17b and the through hole 7k on a cross section including the center axis of the shaft 8 are illustrated. As illustrated in FIG. 8, the pin portion 17b includes a cover portion 40 having a width larger than a width of the through hole 7k in the axial direction of the shaft 8. The width of the cover portion 40 in the axial direction of the shaft 8 is smaller than a minimum width of the pin hole 2d in the axial direction of the shaft 8 (for example, the width of the small-width portion 2d1). Moreover, in the direction orthogonal to the flat surfaces 17b4 and 17b5, a width of the cover portion 40 is larger than a width of the through hole 7k.

Upper surfaces 40a of the cover portion 40 are opposed to the outer peripheral surface of the main body 7a in the radial direction of the shaft 8. The upper surfaces 40a of the cover portion 40 cover an opening portion of the through hole 7k in the radial direction of the shaft 8. The cover portion 40 prevents leakage of the lubricating oil on the inner peripheral surface side of the main body 7a toward the outer peripheral surface side of the main body 7a through the through hole 7k. With the cover portion 40, the load-reducing effect of the oil film owing to the squeeze effect and the wedge effect described above can be improved. When the cover portion 40 is provided as in the eighth embodiment, the pin portion 17b is capable of suppressing the stress generated at the contact portion between the positioning pin 17 and the through hole 7k. When the stress generated at the contact portion between the positioning pin 17 and the through hole 7k is suppressed, the wear at the contact portion between the positioning pin 17 and the through hole 7k can be reduced.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the embodiments and modification examples described above, the examples in which the recess portions and the flat surface portions are formed in the first opposed surfaces (regions R1 and R2) or the second opposed surfaces (regions r1 and r2) have been described. However, the present disclosure is not limited to such examples. The recess portions and the flat surfaces portions may be formed in regions R3 and R4 (hereinafter referred to also as "third opposed surfaces") of the flat surfaces 17b4 and 17b5 or regions r3 and r4 (hereinafter referred to also as "fourth opposed surfaces) of the flat surfaces 7k3 and 7k4.

In the embodiments and modification examples described above, the examples in which the recess portions and the flat surface portions are formed in the first opposed surfaces (regions R1 and R2) or the second opposed surfaces (regions r1 and r2) have been described. However, the present disclosure is not limited to such examples. Only the recess portions may be formed in the first opposed surfaces (regions R1 and R2) or the second opposed surfaces (regions r1 and r2) without forming the flat surface portions. Even when only the recess portions are formed without forming the flat surface portions, the stress generated at the contact portion between the positioning pin 17 and the through hole 7k can be suppressed owing to the squeeze effect and the wedge effect described above. Similarly, also when the recess portions and the flat surface portions are formed in the third opposed surfaces (regions R3 and R4) or the fourth opposed surfaces (regions r3 and r4), only the recess portions may be formed without forming the flat surface portions.

In the embodiment and modification example described above, the case in which the head portion 17a has a sectional area larger than a sectional area of the pin portion 17b on the cross section orthogonal to the insertion direction of the pin portion 17b has been described. However, the configuration in which the head portion 17a has a sectional area larger than a sectional area of the pin portion 17b is not essentially required. For example, the head portion 17a may have a sectional area equal to a sectional area of the pin portion 17b or may have a sectional area smaller than a sectional area of the pin portion 17b.

In the embodiment and modification example described above, the case in which the cutout groove 17a3 is formed in the bottom surface 17a2 of the head portion 17a has been described. However, the cutout groove 17a3 is not essentially required. Thus, it is not always required that the cutout groove 17a3 be formed in the bottom surface 17a2 of the head portion 17a.

INDUSTRIAL APPLICABILITY

The present disclosure can be used for a bearing structure.

What is claimed is:
1. A bearing structure, comprising:
a bearing including a main body having a cylindrical shape through which a shaft is inserted, the main body having a through hole passing through the main body in a direction crossing an axial direction of the shaft;
a positioning member inserted into the through hole; and
a recess portion, which is formed in at least one of a first opposed surface located on an outer peripheral surface of the positioning member and opposed to an inner peripheral surface of the through hole in the axial direction of the shaft and a second opposed surface located on an inner peripheral surface of the through hole and opposed to an outer peripheral surface of the positioning member in the axial direction of the shaft, and is recessed in a separating direction in which the first opposed surface and the second opposed surface separate apart from each other, wherein the recess portion extends vertical with respect to a central axis direction of the through hole, the least one of the first opposed surface and the second opposed surface includes a pair of flat surface portions having a flat surface shape, and the recess portion is formed between the pair of flat surface portions.

2. The bearing structure according to claim 1, wherein the recess portion has a variation portion in which a recess amount in the separating direction continuously varies.

3. The bearing structure according to claim 2, wherein the positioning member includes:

an insertion portion inserted into the through hole; and a position regulating portion, which is formed continuously with the insertion portion, and has a sectional area larger than a sectional area of the insertion portion in a cross section orthogonal to the insertion direction of the insertion portion.

4. The bearing structure according to claim 3, wherein the position regulating portion has an orientation determination portion on a side opposite to a side continuous with the insertion portion.

5. The bearing structure according to claim 1, wherein the positioning member includes:

an insertion portion inserted into the through hole; and a position regulating portion, which is formed continuously with the insertion portion, and has a sectional area larger than a sectional area of the insertion portion in a cross section orthogonal to the insertion direction of the insertion portion.

6. The bearing structure according to claim 5, wherein the position regulating portion has an orientation determination portion on a side opposite to a side continuous with the insertion portion.

* * * * *